(12) United States Patent
Watanabe

(10) Patent No.: US 7,586,531 B2
(45) Date of Patent: *Sep. 8, 2009

(54) AMPLIFICATION TYPE SOLID-STATE IMAGE PICKUP DEVICE

(75) Inventor: Takashi Watanabe, Kyoto-fu (JP)

(73) Assignee: Sharp Kabushiki Kaisha, Osaka (JP)

( * ) Notice: Subject to any disclaimer, the term of this patent is extended or adjusted under 35 U.S.C. 154(b) by 665 days.

This patent is subject to a terminal disclaimer.

(21) Appl. No.: 11/192,634

(22) Filed: Jul. 29, 2005

(65) Prior Publication Data

US 2006/0023097 A1 Feb. 2, 2006

(30) Foreign Application Priority Data

Jul. 29, 2004 (JP) ............... 2004-221474

(51) Int. Cl.
   H04N 3/14 (2006.01)
   H04N 5/335 (2006.01)
   H01L 27/00 (2006.01)
(52) U.S. Cl. ............ 348/300; 348/301; 250/208.1
(58) Field of Classification Search ........ 348/243, 348/245, 250, 300–309, 310
See application file for complete search history.

(56) References Cited

U.S. PATENT DOCUMENTS

| | | | |
|---|---|---|---|
| 6,538,245 B1 * | 3/2003 | Kozlowski | 250/208.1 |
| 6,674,471 B1 | 1/2004 | Masuyama | |
| 6,734,908 B1 * | 5/2004 | Watanabe et al. | 348/308 |
| 6,803,952 B1 * | 10/2004 | Watanabe | 348/241 |
| 6,930,722 B1 * | 8/2005 | Nakamura et al. | 348/362 |
| 6,947,088 B2 * | 9/2005 | Kochi | 348/308 |
| 7,012,238 B2 * | 3/2006 | Watanabe | 250/214 A |
| 2006/0023096 A1 * | 2/2006 | Watanabe | 348/302 |

FOREIGN PATENT DOCUMENTS

| | | |
|---|---|---|
| EP | 1 223 623 A2 | 7/2002 |
| EP | 1 583 351 A1 | 10/2005 |
| JP | 09-046596 | 2/1997 |
| JP | 2001-85658 | 3/2001 |
| JP | 2002-217397 | 2/2002 |
| JP | 2004-23380 | 7/2003 |

OTHER PUBLICATIONS

Inoue, Ikuko et al. "New LV-BPD (Low Voltage Buried Photo-Diode) For CMOS Imager", International Electron Device Meeting (IEDM) Technical Digest, pp. 883-886 (1999).

* cited by examiner

Primary Examiner—Jason Chan
Assistant Examiner—Kelly L Jerabek
(74) Attorney, Agent, or Firm—Edwards Angell Palmer & Dodge LLP; David G. Conlin; David A. Tucker

(57) ABSTRACT

An amplification type solid-state image pickup device includes a pixel section 10 and a control unit 15. The control unit 15 iterates first control and second control a plurality of times during a charge storage operation of storing signal charge into a photodiode 1, the first control being to control a gate voltage of a transfer transistor 2 to a first gate voltage which prevents the signal charge from being transferred from the photodiode 1 to the detection part FD and the second control being to control the gate voltage of the transfer transistor 2 to a second gate voltage which makes the signal charge less movable to the charge detection part FD than the first gate voltage.

6 Claims, 6 Drawing Sheets

AMPLIFICATION TYPE SOLID-STATE IMAGE PICKUP DEVICE

This nonprovisional application claims priority under 35 U.S.C. §119(a) on Patent Application No(s). 2004-221474 filed in Japan on Jul. 29, 2004, the entire contents of which are hereby incorporated by reference.

BACKGROUND OF THE INVENTION

The present invention relates to an amplification type solid-state image pickup device having an amplification device (amplification circuit) in its pixel section. More specifically, the invention relates to an amplification type solid-state image pickup device which includes a plurality of pixels each having a photoelectric conversion element and a transfer transistor for transferring signal charge of the photoelectric conversion element, where signals derived from the individual pixels are amplified and read to output signal lines, respectively.

DESCRIPTION OF THE RELATED ART

Generally, there have been widely used amplification type solid-state image pickup devices in which a pixel section having an amplification function and a scanning circuit placed around the pixel section are included and in which pixel data from the pixel section are read out by the scanning circuit.

More specifically, as the amplification type solid-state image pickup device, there have been known APS (Active Pixel Sensor) type image sensors constructed of CMOS' (Complementary Metal Oxide Semiconductors) that are advantageous for the pixel section to be integrated with its peripheral driver circuit and signal processing circuit. In particular, there have been known APS type image sensors in which one photodiode (PD) and four MOS transistors (Tr) are used to make up the PD+4Tr method (see, e.g., I. Inoue et al., IEEE International Electron Devices Meeting (IEDM) Technical Digest), pp. 883-886 (1999), JP H09-46596 A).

FIG. 9 is a view showing one pixel section of an APS type image sensor according to the background art.

This APS type image sensor includes a photodiode 61 as a photoelectric conversion part, a transfer part 62 for transferring signal charge stored in the photodiode 61, an amplification device 63, a reset part 64 and a pixel selection part 65.

In FIG. 9, reference character $V_R$ denotes a reset drain power supply (constant voltage), $\phi_{TX}$ denotes a drive pulse for the transfer part 62, and $\phi_S$ denotes a drive pulse for the pixel selection part 65. Also, $V_{sig}$ denotes an output signal outputted from an output signal line (vertical signal line) 67.

FIG. 10 is a chart showing operation timings of a drive pulse $\phi_R$, the drive pulse $\phi_S$ and the drive pulse $\phi_{TX}$.

As shown in FIG. 10, in the background-art APS type image sensor, the reset-part drive pulse $\phi_R$ turn on (high level) in a period $T_R$ so that the potential of a charge detection part FD is reset to $V_R$. Then, simultaneously with or subsequent to the turn-on of $\phi_R$, the pixel-selection-part drive pulse $\phi_S$ turn on (high level), by which a potential of the charge detection part reset in a period $T_A$ is read out as an output signal $V_{sig}(R)$ via an amplification device 63, a pixel selection part 65 and a vertical signal line 67.

Thereafter, the transfer-part drive pulse $\phi_{TX}$ turn on (high level) in a period $T_X$, and signal charge is transferred from the photodiode 61 to the charge detection part FD. Since the pixel-selection-part drive pulse $\phi_S$ is in the on (high level) state, the charge-detection-part potential transferred in charge is read as an output signal $V_{sig}(S)$ in a period $T_B$ via the amplification device 63, the pixel selection part 65 and the vertical signal line 67. The voltage of the transfer-part drive pulse $\phi_{TX}$ changes in two levels. In more detail, the voltage of the transfer-part drive pulse $\phi_{TX}$ holds high level $V_H$ in a transfer period $T_{TX}$, and low level $V_0$ during other storage periods. The drive pulse $\phi_{TX}$ is held at the low level $V_0$ while charge generated by photoelectric conversion is stored in the N-type photoelectric conversion storage part of the photodiode.

In the arrangement shown in FIG. 9, on condition that the photodiode 61 provided as a buried type one and that a perfect signal charge transfer from the photodiode 61 to the charge detection part FD is fulfilled, it becomes possible to achieve significant noise reduction so that a high quality image can be obtained.

However, there are issues shown below in achieving it.

FIG. 11 shows a cross-sectional structural view of a buried type photodiode.

This buried type photodiode has a photodiode part which is composed of a P-type substrate 101, an N-type photoelectric conversion storage part 102 formed on the P-type substrate 101, and a heavily doped P-type pinning layer 103 formed on upper surface of the N-type photoelectric conversion storage part 102. Further, on the P-type substrate 101 are formed a transfer gate 106 for transferring signal charge, and a charge detection part 104. A transfer pulse $\phi_{TX}$ is applied to the transfer gate 106, while a potential $V_{FD}$ is applied to the charge detection part 104. The transfer pulse $\phi_{TX}$ is supplied from a CMOS driver circuit, where the low level $V_0$ is given by GND level and the high level $V_H$ is given by power supply voltage $V_D$.

During a charge storage period in which electric charge generated by photoelectric conversion is stored in the N-type photoelectric conversion storage part 102, the level of transfer pulse $\phi_{TX}$ is given by GND. In the charge storage period, a depletion region (depicted by broken line) spreads from the N-type photoelectric conversion storage part 102 of the photodiode toward the P-type substrate 101 below.

In this case, on condition that the transfer pulse $\phi_{TX}$ is at the GND level, part of the depletion region reaches the channel region under the transfer gate 106, so that the semiconductor surface of this partial region is activated and a dark current is generated energetically at the activated partial region. Dark current charge generated by such a mechanism would flow into the N-type photoelectric conversion storage part 102 of the photodiode and mix into the signal charge.

Thus, the background-art APS type image sensor has a problem of occurrence of large dark-state noise due to the mixing of the dark current charge into the signal charge, i.e., dark current shot noise that varies in terms of time as well as dark-current fixed pattern noise that causes the dark current charge amount to vary on a pixel to pixel basis. Due to occurrence of these noises, there is a problem of worsened image quality.

As a buried type photodiode that can avoid those problems, there has been provided, for example, one described in JP 2002-217397 A.

In this buried type photodiode, the low level $V_0$ of the transfer-part drive pulse $\phi_{TX}$ is set to a negative voltage.

FIG. 12 is a timing chart showing the transfer-part drive pulse $\phi_{TX}$, the reset-part drive pulse $\phi_R$ and the pixel-selection-part drive pulse $\phi_S$ in the buried type photodiode.

In this buried type photodiode, since a pinning layer is formed in the channel region under the transfer gate, the semiconductor surface of the channel region never activated, so that occurrence of dark currents can be suppressed.

However, in this buried type photodiode, as shown in FIG. 12, since the drive pulse $\phi_{TX}$ is a negative voltage during the entire period in which charge storage is performed, the channel under the transfer gate is kept fully closed during this entire period. This gives rise to a problem that upon occurrence of excessive charge due to incidence of intense light on the photodiode during the entire period, part of the charge that cannot find any way of escape would enter the P substrate and spread up to surrounding pixels, and whereby a large blooming phenomenon happen.

As a consequence, there are problems that such a complex structure as longitudinal overflow drain using the N substrate is inevitably adopted, and that negative power supply, which is not usually used for CMOS', is needed and additional burdens are needed such as internal provision of a negative voltage generation circuit or the like.

SUMMARY OF THE INVENTION

Accordingly, an object of the present invention is to provide an amplification type solid-state image pickup device which is capable of inactivating the semiconductor surface of the channel region under the transfer gate during the charge storage period and which does not need any complex structure or negative power supply or the like and moreover which is capable of implementing remarkable noise reduction and obtaining high-quality images.

In order to accomplish the above object, there is proved, an amplification type solid-state image pickup device comprising:

a pixel section having a photoelectric conversion element, a transfer transistor for transferring signal charge derived from the photoelectric conversion element, and an amplification device for amplifying signal charge transferred to a charge detection part by the transfer transistor; and a control unit for iterating first control and second control a plurality of times during a charge storage operation of storing the signal charge into the photoelectric conversion element, the first control being to control a gate voltage of the transfer transistor to a first gate voltage and the second control being to control the gate voltage of the transfer transistor to a second gate voltage which makes the signal charge less movable to the charge detection part than the first gate voltage.

According to this invention, since the control unit iterates a plurality of times first control, which is to control a gate voltage of the transfer transistor to a first gate voltage, and second control, which is to control the gate voltage of the transfer transistor to a second gate voltage which makes the signal charge less movable to the charge detection part than the first gate voltage, it become possible to generate a pinning layer iteratively in the gate/channel region of the transfer transistor by the second control. Therefore, by the iterative pinning of the gate/channel region, the energy level of the semiconductor surface dominant for occurrence of dark currents can be generally normally filled (trapped) with pinning charge. Thus, the energy level can be inactivated, so that occurrence of dark currents can be prevented, remarkable noise reduction can be fulfilled, and high-quality images can be obtained.

Also, according to this invention, by virtue of the iteration of the first control and the second control, even if intense light comes incident on the photoelectric conversion element during the charge storage period and excess charge occure, part of the charge that cannot find any way of escape can be let to flow to the charge detection part during the first control, in which the signal charge is more movable to the charge detection part than in the progress of the second control. Thus, it is possible to reliably prevent the possibility that part of the charge that cannot find any way of escape may intrude into the substrate and spread up to peripheral pixels, causing the occurrence of a large blooming phenomenon.

Furthermore, according to this invention, remarkable noise reduction can be fulfilled without using any negative power supply (negative power supply generation circuit), and the structure does not become complex.

In one embodiment, the control unit periodically iterates the first control and the second control.

According to this embodiment, since the control unit iterates the first control and the second control periodically, the pinning layer can be formed periodically during the charge storage operation. Thus, occurrence of dark currents can be prevented reliably.

In one embodiment, the control unit, in a first period, controls the gate of the transfer transistor to a high impedance state and, in a second period within the first period, performs the second control by changing a potential of the charge detection part to a potential of a direction identical to a direction of a change from the first gate voltage to the second gate voltage.

According to this embodiment, in the first period, the gate of the transfer transistor is controlled to the high impedance state, and in a second period within the first period, the potential of the charge detection part is set to a potential which makes the signal charge less movable to the charge detection part than the potential of the charge detection part in the first period. Thus, the pinning layer can easily be formed under the gate of the transfer transistor.

In one embodiment, the photoelectric conversion element is a buried type photodiode.

According to this embodiment, since the photoelectric conversion element is a buried type photodiode, dark currents that occur due to the photodiode itself can be reduced to a large extent. Therefore, in combination with the dark-current occurrence reducing effect under the gate by the two-step control, dark currents of the whole pixel section can be reduced to a large extent.

In one embodiment, further comprising a drive signal line capacitively coupled with the charge detection part via a first capacitance, wherein the control unit performs the second control by outputting to the drive signal line a control signal which causes the potential of the charge detection part to be changed to a potential of a direction identical to a direction of the change from the first gate voltage to the second gate voltage.

According to this embodiment, the first capacitance can be utilized as a pull-down capacitance (for electrons serving as the signal charge) or a pull-up capacitance (for holes serving as the signal charge). Thus, only by the potential of the drive signal line being stepped down (for electrons serving as the signal charge) or stepped up (for holes serving as the signal charge), the gate voltage of the transfer transistor can easily be set to the second gate voltage.

In one embodiment, a second capacitance connected between the gate of the transfer transistor and the charge detection part is further comprised.

According to this embodiment, since the second capacitance is connected between the gate of the transfer transistor and the charge detection part, there can easily be generated a potential difference between the potential of the gate and the potential of the charge detection part during the second period. Thus, the gate voltage can easily be set to the second gate voltage during the second period.

In one embodiment, the control unit includes a drive circuit section and a control section for controlling the drive circuit section, the drive circuit section comprising:

a switching MOS transistor whose first terminal is connected to the gate of the transfer transistor;

a first switching element for turning on or off connection between a gate terminal of the switching MOS transistor and a power supply;

a second switching element for turning on or off connection between a second terminal of the switching MOS transistor and the ground; and a third switching element for turning on or off connection between the gate terminal of the switching MOS transistor and the first terminal of the switching MOS transistor, and wherein the control section, for execution of the first control, turns the first switching element on, the second switching element on and the third switching element off, while the control section, for execution of the second control, turns the first switching element off, the second switching element off and the third switching element on.

According to this embodiment, the first control can easily be executed only by the control section which turns the first switching element on, the second switching element on, and the third switching element off.

Also, according to this embodiment, the gate of the transfer transistor can easily be maintained at the high impedance state by the control section's turning the first switching element off, the second switching element off, and the third switching element on. Therefore, in this state, by the control section's adjusting the potential of the charge detection part properly, the second control can easily be achieved.

In one embodiment, the control unit further comprises a voltage output blocking circuit having one end connected to a gate of the transfer transistor and serving to block voltages equal to or lower than the first gate voltage from being outputted from the other end of the voltage output blocking circuit.

According to this embodiment, by the inclusion of the voltage output blocking circuit that blocks voltages equal to or lower than the first gate voltage from being outputted from the other end, it never occurs that a voltage larger than the first gate voltage is outputted from the other end. Thus, occurrence of malfunctions at the other end side of the voltage output blocking circuit can be prevented.

In one embodiment, a light receiving area in which a plurality of the pixel sections are arrayed in a matrix shape is formed, the amplification device is a switched capacitor amplifier whose input side is connected to an output side of the transfer transistor and whose output side is connected to an output signal line, and the control unit iterates control operation of reading a signal derived from the photoelectric conversion element via the transfer transistor by the switched capacitor amplifier part in each of the pixel sections.

According to this embodiment, the charge-voltage conversion gain can be determined not by the capacitance of the charge detection part, which is the output side of each transfer transistor, but by the capacitance inserted between input and output of the switched capacitor amplifier part. Therefore, for example, even if the capacitance of the charge detection part is increased by inserting the first capacitance between the drive signal line and the charge detection part, decreases of charge-voltage conversion gain can be prevented.

According to the amplification type solid-state image pickup device of the present invention, the control unit iterates a plurality of times the first control and the second control during a charge storage operation, the first control being to control the gate voltage of the transfer transistor to a first gate voltage which blocks signal charge from being transferred from the photoelectric conversion element to the charge detection part, and the second control being to control the gate voltage of the transfer transistor to a second gate voltage which makes the signal charge less movable to the charge detection part than the first gate voltage. Thus, it become possible to generate a pinning layer iteratively in the gate/channel region of the transfer transistor by the second control. Therefore, the energy level of the semiconductor surface dominant for occurrence of dark currents can be almost always filled (trapped) with pinning charge. Consequently, the energy level can be inactivated, so that occurrence of dark currents can be prevented, remarkable noise reduction can be fulfilled, and high-quality images can be obtained.

Also, according to the amplification type solid-state image pickup device of the present invention, remarkable noise reduction can be fulfilled without using any negative power supply (negative power supply generation circuit), and the structure does not become complex.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein.

DETAILED DESCRIPTION OF THE INVENTION

Hereinafter, the present invention is described in detail by embodiments thereof illustrated in the accompanying drawings.

Figure 1A:
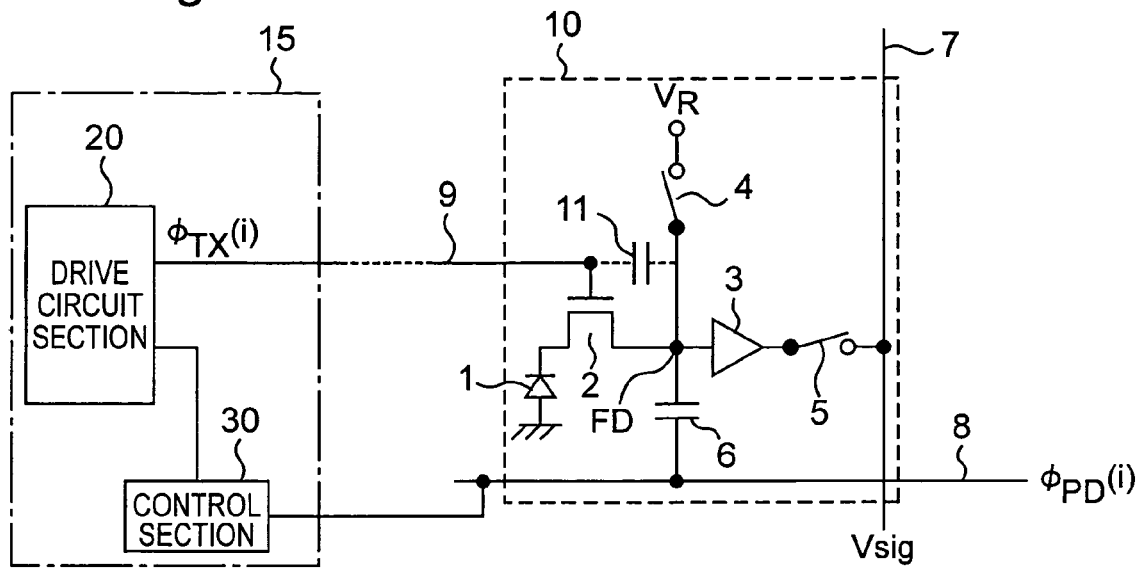
FIG. 1A is a circuit diagram showing part of an amplification type solid-state image pickup device according to one embodiment of the present invention.

FIG. 1A is a circuit diagram showing part of an amplification type solid-state image pickup device according to one embodiment of the present invention.

This amplification type solid-state image pickup device includes a pixel section 10 and a control unit 15.

The pixel section 10 includes a buried type photodiode 1 as an example of the photoelectric conversion element, a transfer part 2, an amplification device 3, a reset part 4, a selection part 5, a pull-down capacitance 6 as a first capacitance, an output signal line 7, a drive signal line 8 and transfer signal line 9.

The transfer part 2 is composed of a transfer transistor and serves for transferring, to a detection part FD, electrons as an example of the signal charge of the buried type photodiode 1. The amplification device 3 amplifies a signal received from the transfer part 2, and the reset part 4 resets the detection part FD to the reset potential $V_R$. The selection part 5 selects read of a signal received from the amplification device 3, and the pull-down capacitance 6 is a capacitance for pulling down the potential of the detection part FD by a signal received from the drive signal line 8. The output signal line (vertical signal line) 7 transfers a signal read by the selection part 5, and the transfer signal line 9 applies a transfer signal to the transfer part 2.

Also, a step-down capacitance 11 as a second capacitance is inserted between the detection part FD and the transfer signal line 9. The step-down capacitance 11 may be either a gate/source capacitance of the transfer transistor 2 as shown in FIG. 1, or another capacitance formed specially. Also, reference characters $\phi_{TX}$ and $\phi_{PU}$ denote signals to be applied to the transfer part 2 and the drive signal line 8, respectively. It is noted that all of these elements do not necessarily need to be included in every pixel.

The control unit 15 includes a drive circuit section 20 and a control section 30. The drive circuit section 20 is a transfer signal generation circuit for generating a transfer signal which is given to the transfer part 2 via the transfer signal line 9. The control section 30 supplies a drive signal necessary to implement operations of individual parts in the construction shown in FIG. 1A.

Figure 1B:
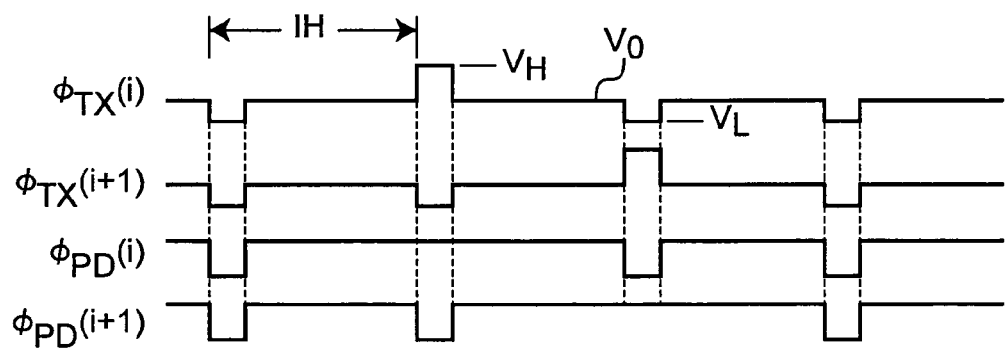
FIG. 1B is a timing chart for explaining operation of the amplification type solid-state image pickup device shown in FIG. 1A.

FIG. 1B is a timing chart for explaining operation of FIG. 1A.

Referring to FIG. 1B, reference character $\phi_{TX}(i)$ denotes a drive pulse applied to the gate of the transfer transistor of the i-th pixel, and $\phi_{PD}(i)$ denotes pull-down signal pulse applied to the detection part of the i-th pixel.

As shown in FIG. 1B, the drive pulse $\phi_{TX}(i)$ once goes high level $V_H$, where the signal charge (electrons) that has been stored in the photodiode 1 is transferred to the charge detection part FD, followed by a reading operation. Thereafter, the drive pulse $\phi_{TX}(i)$ goes low level $V_0$, where a charge storage operation in the photodiode 1 is performed until another reading operation for the following frame is performed. During this charge storage operation, as shown in FIG. 1B, the drive pulse $\phi_{TX}(i)$ periodically changes between a first low level $V_0$ on the longer time side and a second low level $V_L$ on the shorter time side during one horizontal scanning period (1H). Control for switching $\phi_{TX}(i)$ at the low level $V_0$, i.e., control for switching the gate voltage of the transfer transistor 2 (see FIG. 1A) at the first gate voltage $V_0$, corresponds to first control. Also, control for switching $\phi_{TX}(i)$ at the second low level $V_L$, i.e., control for switching the gate voltage of the transfer transistor 2 (see FIG. 1A) at the second gate voltage $V_L$, corresponds to second control.

A second low level period is included in a horizontal blanking period. The second low level is driven by the pull-down signal $\phi_{PD}(i)$ received from the drive signal line 8.

Figure 2:
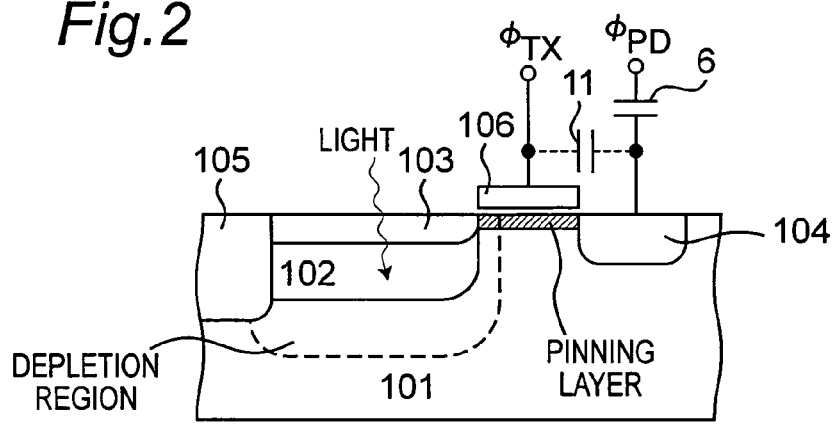
FIG. 2 is a cross-sectional structural view of a buried type photodiode included in the amplification type solid-state image pickup device.
Figure 11:
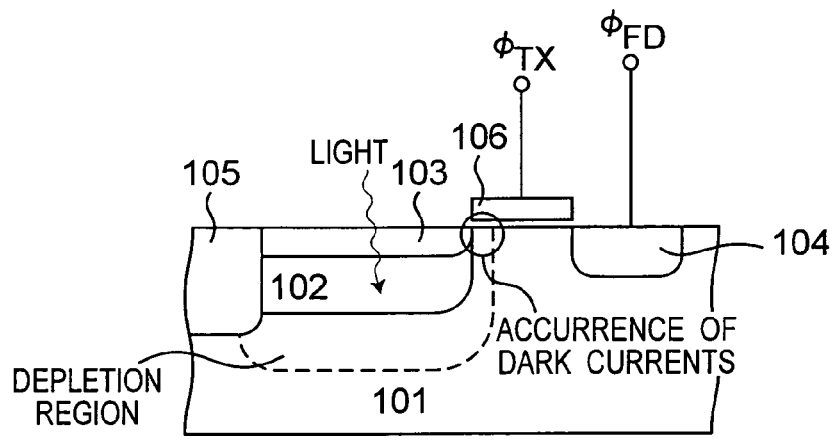
FIG. 11 is a cross-sectional structural view of a buried type photodiode according to the background art.
Figure 12:
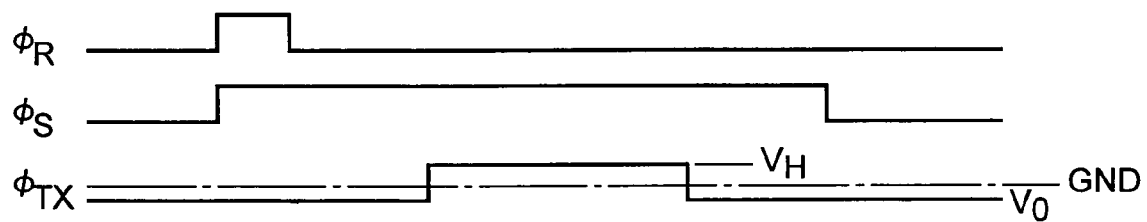
FIG. 12 is a chart showing operation timings of various drive pulses in a second buried type photodiode according to the background art.

FIG. 2 is a cross-sectional structural view of the buried type photodiode. Operation of the buried type photodiode shown in FIG. 1 are explained below with reference to FIG. 2. It is noted that the same reference numerals and characters of FIG. 2 as those of FIG. 11 represent like contents, respectively.

Referring to FIG. 2, in the charge storage period, the depletion region (depicted by broken line) spreads from the N-type photoelectric conversion storage part 102 of the photodiode toward the P-type substrate 101 below. With $\phi_{TX}$ at the first low level $V_0$, part of the depletion region reaches the channel region under the transfer gate 106. However, because of a step-down to the second low level $V_L$ in a 1H period, a pinning layer is formed in the channel region under the transfer gate 106 in this period.

In more detail, although an interface state is present at the interface between semiconductor and its oxide, yet the formation of a pinning layer causes the interface state to trap pinning charge in short time, and thereafter the pinning charge is discharged in long time (where the more the energy level is closer to the center of the band gap that is dominant for occurrence of dark currents, the more the discharge constant becomes longer).

Accordingly, by the formation of such a periodical pinning layer as shown above, the interface state that contributes to the occurrence of dark currents is enabled to maintain the normally state trapped pinning charge. That is, the semiconductor surface of the channel region is inactivated, so that the occurrence of dark currents can be suppressed. As a result, the dark-state noise is suppressed and the achievement of a high-quality image becomes implementable.

Furthermore, as shown in FIG. 1B, the transfer gate is held at the first low level $V_0$ for most of the period, and the channel region under the transfer gate 106 never becomes fully closed. Therefore, even if excess light comes incident on the N-type photoelectric conversion storage part 102, with the result that excess charge occure, the resulting excess charge can be escaped via the transfer transistor 2, the charge detection part FD, and the reset part 4 to the reset drain $V_R$ (see FIG. 1), so that intrusion of excess voltage into the substrate can be prevented. Thus, even without incorporation of any special structure to the pixel section, it is possible to efficiently prevent the occurrence of the blooming phenomenon due to spreading of the excess voltage up to peripheral pixels, and so is it possible to provide overflow measures for excess charge with simplicity and low cost.

Figure 3:
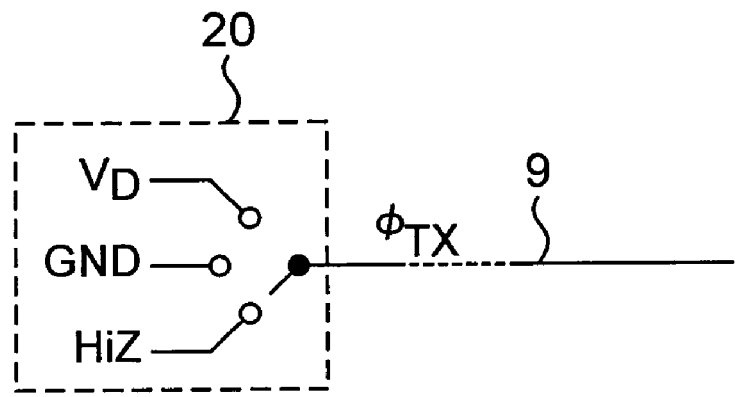
FIG. 3 is a circuit diagram schematically showing an embodiment of a drive circuit section which the amplification type solid-state image pickup device can include.

FIG. 3 is a circuit diagram schematically showing an embodiment of the drive circuit section 20.

The drive circuit section 20 is so constructed as to be capable of selecting three states. More specifically, the drive circuit section 20 is enabled to select a high level $V_D$ state (first state) with the transfer part 2 on, a GND state (second state) of the first low level with the transfer part 2 off, and a HiZ state (third state) with the transfer transistor 2 held off and with the gate of the transfer part 2 in a high impedance state.

After a transition from GND to HiZ state, a pulse that gives rise to a change to the low level is applied to the transfer signal line 9, by which the potential of the detection part FD connected to the transfer signal line 9 via the step-down capacitance 11 is changed to the second low level, which is further lower than the first low level. As a result of this, the gate of the transfer transistor can be changed, after the period of the first low level, to the second low level, which is much lower in potential, so that the gate of the transfer transistor is stepped down to a negative voltage. Then, during this period, the pinning layer is formed in the channel region under the gate of the transfer part 2.

Figure 4A:
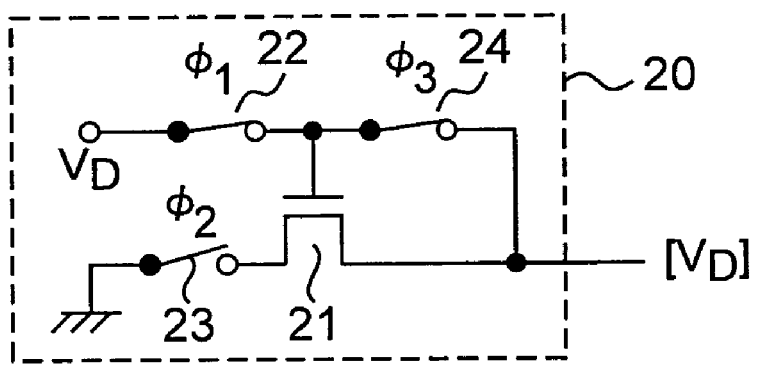
FIG. 4A is a circuit diagram concretely showing an embodiment of the drive circuit section that the amplification type solid-state image pickup device can include.
Figure 4B:
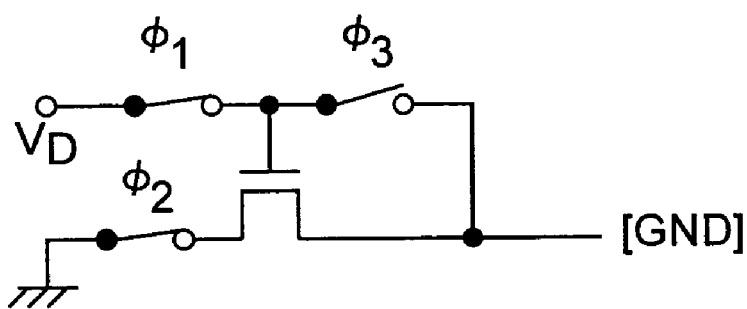
FIG. 4B is a circuit diagram concretely showing an embodiment of the drive circuit section that the amplification type solid-state image pickup device can include.
Figure 4C:
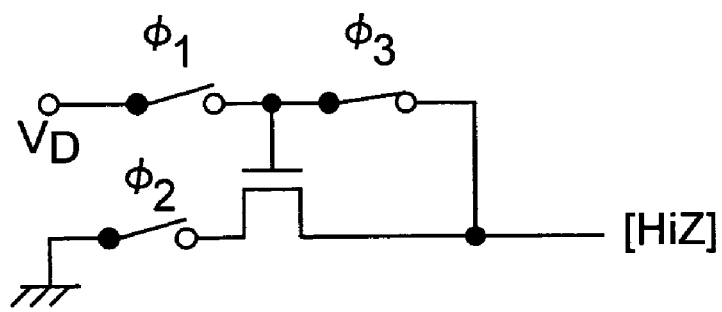
FIG. 4C is a circuit diagram concretely showing an embodiment of the drive circuit section that the amplification type solid-state image pickup device can include.

FIG. 4 is a circuit diagram concretely showing an embodiment of the drive circuit section 20. More specifically, FIG. 4A represents the first state, FIG. 4B represents the second state, and FIG. 4C represents the third state. Referring to FIGS. 4A and 4B, reference numeral 21 denotes a P-type MOS transistor, and 22, 23 and 24 denote first, second and third switching elements which are driven by pulses $\phi_1$, $\phi_2$ and $\phi_3$, respectively, outputted by the control section 30 (see FIG. 1A).

As shown in FIGS. 4A, 4B and 4C, a source terminal that is a first terminal of the P-type MOS transistor 21 is connected to the gate of the transfer transistor 2 (see FIG. 1A). The first switching element 22 switches on (conducting) or off (nonconducting) connection between the gate terminal of the P-type MOS transistor 21 and power supply $V_D$. The second switching element 23 switches on (conducting) or off (nonconducting) connection between the drain terminal, which is a second terminal of the P-type MOS transistor 21, and the ground. The third switching element 24 switches on (conducting) or off (nonconducting) connection between the gate terminal of the P-type MOS transistor 21 and the source terminal of the P-type MOS transistor 21.

Figure 5:
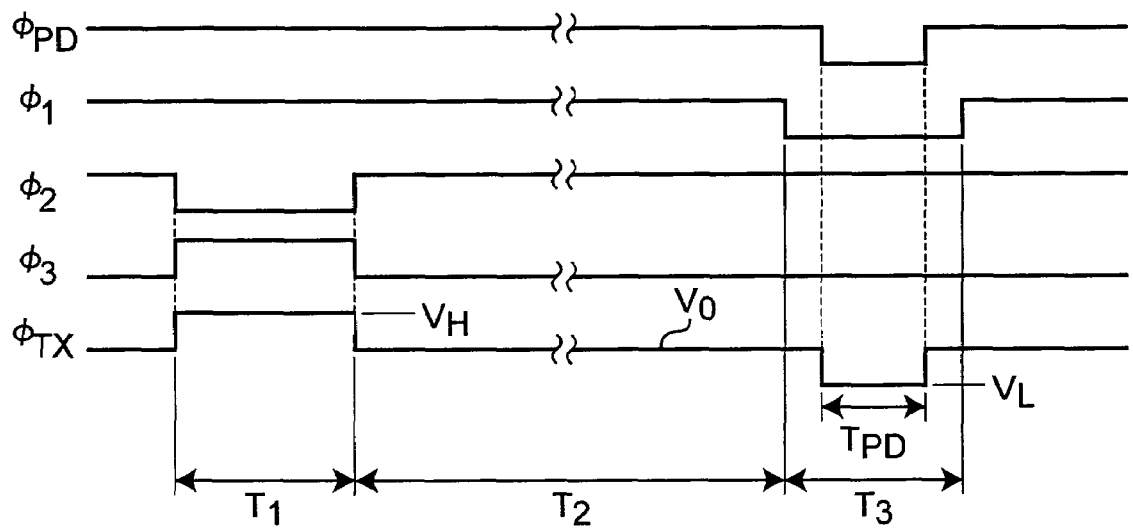
FIG. 5 is a timing chart for explaining operations of the drive circuit section shown in FIGS. 4A to 4C.

FIG. 5 is a timing chart for explaining operations in the individual states of FIGS. 4A to 4C.

Hereinbelow, operations of the pixel section are explained with reference to FIGS. 4A to 4C and FIG. 5.

Referring to FIG. 5, in a period $T_1$, the pulse $\phi_1$ is at high level (on), the pulse $\phi_2$ is at low level (off) and the pulse $\phi_3$ is at high level (on), which is the state of FIG. 4A. In this case, an output of the drive circuit section 20 is connected directly to the $V_D$ terminal, and the pulse $\phi_{TX}$ is set to high level ($V_H$).

In a period $T_2$, the pulse $\phi_1$ is at high level (on), the pulse $\phi_2$ is at high level (on) and the pulse $\phi_3$ is at low level (off), which is the state of FIG. 4B. In this case, an output of the drive circuit section 20 is disconnected from the $V_D$ terminal, and the P-type MOS transistor is turned on, being driven. Then, its input side goes GND, and the output of the drive circuit section 20, i.e., the pulse $\phi_{TX}$ is set to the first low level ($V_0$). That is, the gate voltage of the transfer transistor 2 (see FIG. 1A) is controlled to the first gate voltage $V_0$.

In a period $T_3$ as a first period, the pulse $\phi_1$ is at low level (off), the pulse $\phi_2$ is at low level (off) and the pulse $\phi_3$ is at high level (on), which is the state of FIG. 4C. In this case, the input side of the drive circuit section 20 is open and is connected nowhere. On the output side of the drive circuit section 20, gate and source of the P-type MOS transistor are connected to each other. In this case, on condition that the P-type MOS transistor is an enhancement MOS, there flows no current between source and gate even if the source potential becomes higher than a power supply voltage for use in the normal state, so that the off state is held. As a result of this, the output side of the drive circuit section 20 is set to a high impedance state.

As shown in FIG. 5, in the period $T_3$ in which the output side of the drive circuit section 20 is in the high impedance state, the control section 30 (see FIG. 1A) operates so that the potential of the pulse $\phi_{PD}$ applied to the drive signal line 8 is kept lowered during a period $T_{PD}$, which is a second period, with the result that the potential of the transfer signal line 9 (potential of $\phi_{TX}$) is stepped down from the first low level $V_0$ to the second low level $V_L$ via the step-down capacitance 11. That is, the gate voltage of the transfer transistor 2 (see FIG. 1A) is controlled to the second gate voltage $V_L$.

During the period $T_2$, and during the periods other than the period $T_{PD}$ in the period $T_3$ (periods in which the potential of the transfer signal line 9 is set at $V_0$), the first control is performed. In the period $T_{PD}$, the second control is performed.

Figure 6:
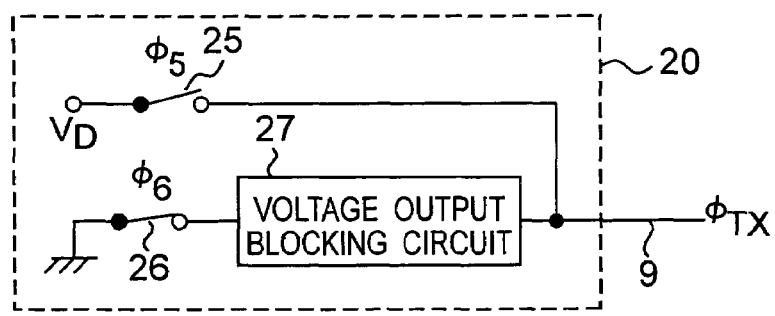
FIG. 6 is a circuit diagram concretely showing another embodiment of the drive circuit section that the amplification type solid-state image pickup device can include.
Figure 7:
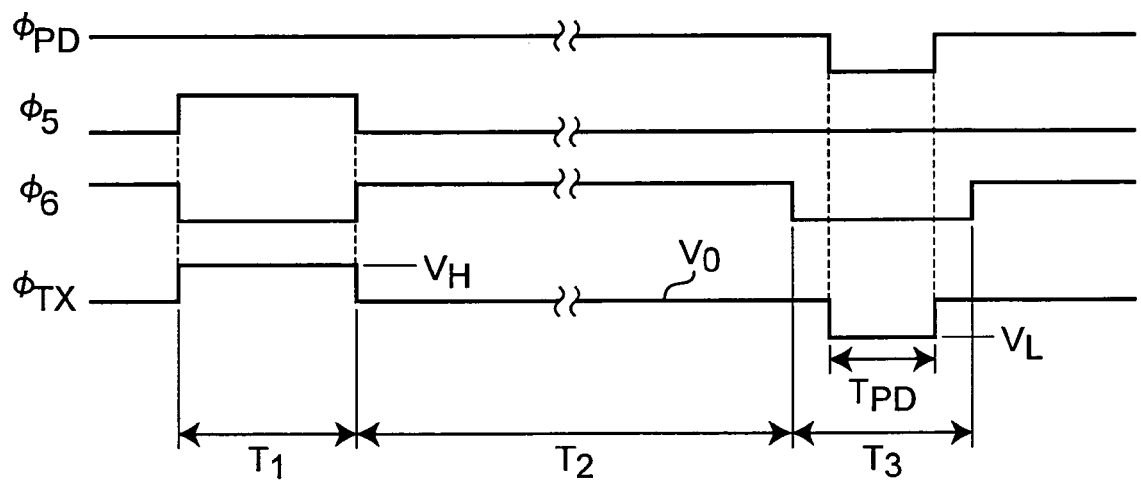
FIG. 7 is a chart showing operation timings of various drive pulses in the case where the drive circuit section shown in FIG. 6 is adopted.

FIG. 6 is a circuit diagram concretely showing another embodiment of the drive circuit section 20 shown in FIG. 3. In FIG. 6, reference numeral 25 denotes a switching element which is driven by a pulse $\phi_5$ received from the drive section 30, and 26 denotes a switching element which is driven by a pulse $\phi_6$ received from the drive section 30. Also, numeral 27 denotes a voltage output blocking circuit for blocking voltages lower than the first low level. FIG. 7 is a chart showing operation timings of the pulse $\phi_5$, the pulse $\phi_6$ and the pulse $\phi_{TX}$.

Now, operations of the drive circuit section 20 are explained with reference to FIGS. 6 and 7.

As shown in FIG. 7, in a period $T_1$, the pulse $\phi_5$ is at high level (on), and the pulse $\phi_6$ is at low level (off). Then, an output of the drive circuit section 20 is connected directly to the $V_D$ terminal, and the pulse $\phi_{TX}$ goes high level ($V_H$). Also, in a period $T_2$, the pulse $\phi_5$ is at low level (off), and the pulse $\phi_6$ is at high level (on). Then, an output of the drive circuit section 20 is disconnected from the $V_D$ terminal, and the input side of the voltage output blocking circuit 27 is connected to GND, by which the output of the drive circuit section 20 goes ground voltage GND, i.e., first low level ($V_0$). That is, the gate voltage of the transfer transistor 2 (see FIG. 1A) is controlled to the first gate voltage $V_0$.

In a period $T_3$ as a first period, the pulse $\phi_5$ is at low level (off), and the pulse $\phi_6$ is at low level (off). In this case, the input side of the drive circuit section 20 is open, being connected nowhere. Then, the output side of the drive circuit section 20 is set to a high impedance state in which no current flows. In the period $T_3$, in which the output side of the drive circuit section 20 is in the high impedance state, the control section 30 (see FIG. 1A) operates so that the potential of the pulse $\phi_{PD}$ applied to the drive signal line 8 is kept lowered during a period $T_{PD}$, which is a second period, so that the potential of the transfer signal line 9 connected to the drive signal line 8 via the step-down capacitance 11 is stepped down from GND, i.e. the first low level ($V_0$), to the second low level ($V_L$), which is a negative voltage. That is, the gate voltage of the transfer transistor 2 (see FIG. 1A) is controlled to the second gate voltage $V_L$.

The voltage output blocking circuit 27 is connected between the output side of the drive circuit section 20 and the ground terminal GND, and blocks voltages equal to or lower than the first low level (GND). Thus, during the period $T_3$, when the gate voltage of the transfer transistor is stepped down to the second low level, which is lower than GND, it is prevented that the second low level may cause malfunctions of the switching element 26, to which GND is fed.

Figure 8:
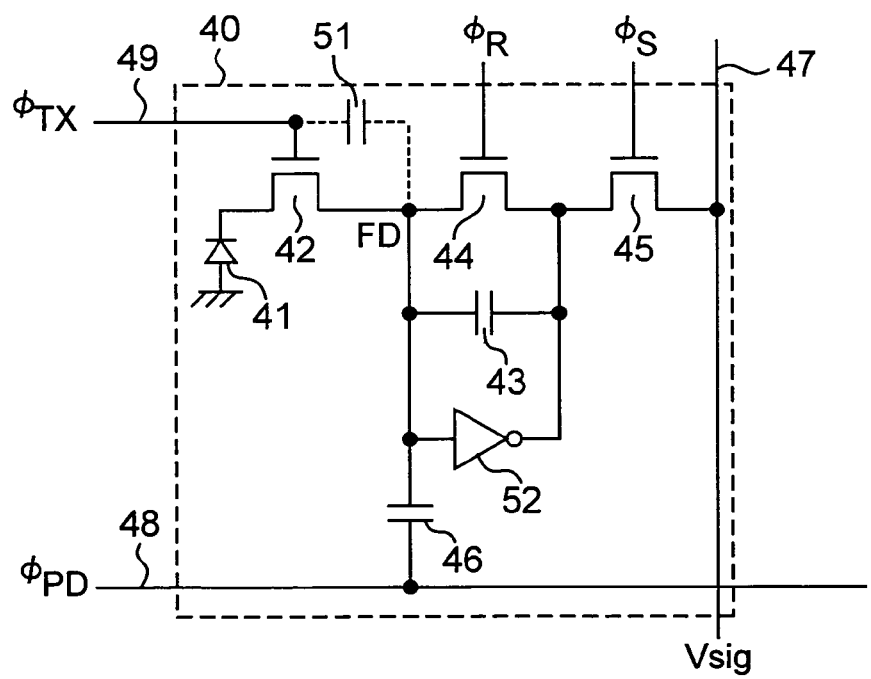
FIG. 8 is a view showing the pixel section in another embodiment of the invention.
Figure 9:
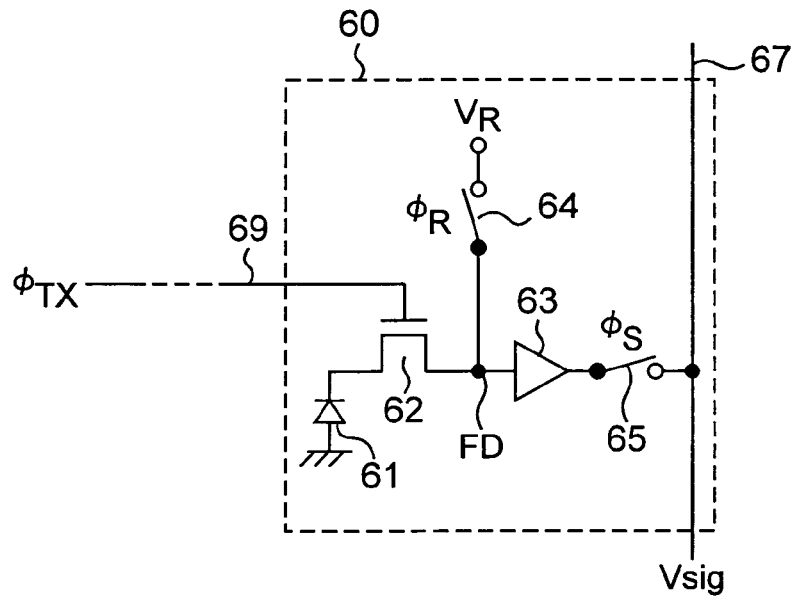
FIG. 9 is a view showing one pixel section of an APS type image sensor according to the background art.
Figure 10:
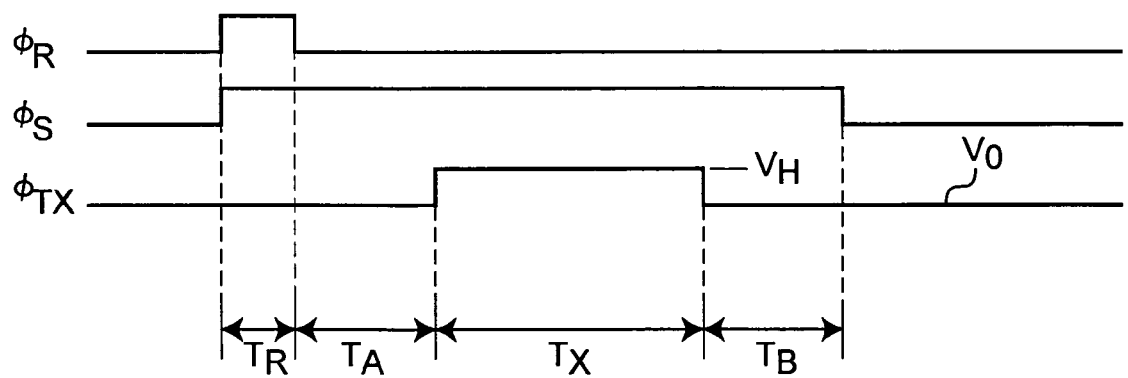
FIG. 10 is a chart showing operation timings of various drive pulses in the APS type image sensor according to the background art.

FIG. 8 is a view showing a pixel section 40 in another embodiment of the invention.

The pixel section 40 shown in FIG. 8 differs from the pixel section 10 shown in FIG. 1A in terms of the structure of amplification device and charge voltage conversion part. The pixel section 40 includes a buried type photodiode 41 as a photoelectric conversion element, a transfer part 42 for transferring signal charge (electrons) of the photodiode 41 to a detection part FD, a selection part 45 for selecting read of a signal received from an amplification device, a capacitance 46 serving as a first capacitance for pulling down a potential of the detection part FD by a signal received from a drive signal line 48, an output signal line 47 for transferring a signal read out by the selection part 45, and a transfer signal line 49 for applying a transfer signal $\phi_{TX}$ to the transfer part 42.

The pixel section 40 is provided with a switched capacitor amplifier part whose input side is connected to the output side of the transfer transistor and whose output side is connected to the selection part 45. This switched capacitor amplifier part is made up of an inverting amplifier 52, a signal storage capacitance 43 connected between its input and output, and a reset part 44. When the gain of the inverting amplifier 52 is high enough, signal charge (electrons) transferred from the photodiode via the transfer part 42 is stored in the signal storage capacitance 43. That is, the charge-voltage conversion gain has a correlation with the signal storage capacitance 43 (i.e., depends on the signal storage capacitance 43), but does not depend on the output-side capacitance of the transfer transistor. For this reason, the capacitance 46 for pulling down the potential of the detection part FD by the signal received from the drive signal line 48, as well as a capacitance 51 as a second capacitance between the detection part FD and the transfer signal line 49, are inserted in order to step down the potential of the detection part FD, so that the charge-voltage conversion gain does not lower even if the capacity of the detection part FD increases.

Although electrons are adopted as the signal charge in the above-described embodiment, yet it is of course allowable in the present invention to adopt holes as the signal charge under the condition that the photodiode, the MOS transistor, the doped layers, the drive voltages and the like are all inverted in polarity.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An amplification type solid-state image pickup device comprising:
    a pixel section having a photoelectric conversion element,
    a transfer transistor for transferring signal charge derived from the photoelectric conversion element, and
    an amplification device for amplifying signal charge transferred to a charge detection part by the transfer transistor; and
    a control unit for iterating first control and second control a plurality of times during a charge storage operation for storing the signal charge into the photoelectric conversion element, the first control being to control a gate voltage of the transfer transistor to a first gate voltage and the second control being to control the gate voltage of the transfer transistor to a second gate voltage which makes the signal charge less moveable to the charge detection part than the first gate voltage,
    wherein:
        the control unit, in a first period, controls the gate of the transfer transistor to a high impedance state and, in a second period within the first period, performs the second control by changing a potential of the charge detection part to a potential of a direction identical to a direction of a change from the first gate voltage to the second gate voltage.

2. The amplification type solid-state image pickup device as claimed in claim 1, further comprising:
    a drive signal line capacitively coupled with the charge detection part via a first capacitance, wherein,
        the control unit performs the second control by outputting to the drive signal line a control signal which causes the potential of the charge detection part to be changed to a potential of a direction identical to a direction of the change from the first gate voltage to the second gate voltage.

3. The amplification type solid-state image pickup device as claimed in claim 2, further comprising:
    a second capacitance connected between the gate of the transfer transistor and the charge detection part.

4. An amplification type solid-state image pickup device comprising:
    a pixel section having a photoelectric conversion element,
    a transfer transistor for transferring signal charge derived from the photoelectric conversion element, and
    an amplification device for amplifying signal charge transferred to a charge detection part by the transfer transistor; and
    a control unit for iterating first control and second control a plurality of times during a charge storage operation for storing the signal charge into the photoelectric conversion element, the first control being to control a gate voltage of the transfer transistor to a first gate voltage and the second control being to control the gate voltage of the transfer transistor to a second gate voltage which makes the signal charge less moveable to the charge detection part than the first gate voltage,
    wherein:
        the control unit includes a drive circuit section and a control section for controlling the drive circuit section,
        the drive circuit section comprising:
            a switching MOS transistor whose first terminal is connected to the gate of the transfer transistor;
            a first switching element for turning on or off connection between a gate terminal of the switching MOS transistor and a power supply;
            a second switching element for turning on or off connection between a second terminal of the switching MOS transistor and the ground; and
            a third switching element for turning on and off connection between the gate terminal of the switching MOS transistor and the first terminal of the switching MOS transistor;
        and wherein:
            the control section, for execution of the first control, turns the first switching element on, the second switching element on, and the third switching element off, while the control section, for execution of the second control, turns the first switching element off, the second switching element off and the third switching element on.

5. An amplification type solid-state image pickup device comprising:
    a pixel section having a photoelectric conversion element,
    a transfer transistor for transferring signal charge derived from the photoelectric conversion element, and
    an amplification device for amplifying signal charge transferred to a charge detection part by the transfer transistor; and a control unit for iterating first control and second control a plurality of times during a charge storage operation for storing the signal charge into the photoelectric conversion element, the first control being to control a gate voltage of the transfer transistor to a first gate voltage and the second control being to control the gate voltage of the transfer transistor to a second gate voltage which makes the signal charge less moveable to the charge detection part than the first gate voltage, wherein:

the control unit further comprises:
a voltage output blocking circuit having one end connected to a gate of the transfer transistor and serving to block voltages equal to or lower than the first gate voltage from being outputted from the other end of the voltage output blocking circuit.

6. An amplification type solid-state image pickup device comprising:

a pixel section having a photoelectric conversion element, a transfer transistor for transferring signal charge derived from the photoelectric conversion element, and an amplification device for amplifying signal charge transferred to a charge detection part by the transfer transistor; and a control unit for iterating first control and second control a plurality of times during a charge storage operation for storing the signal charge into the photoelectric conversion element, the first control being to control a gate voltage of the transfer transistor to a first gate voltage and the second control being to control the gate voltage of the transfer transistor to a second gate voltage which makes the signal charge less moveable to the charge detection part than the first gate voltage, wherein:

a light receiving area in which a plurality of the pixel sections are arrayed in a matrix shape is formed;

the amplification device is a switched capacitor amplifier whose input side is connected to an output side of the transfer transistor and whose output side is connected to an output signal line, and the control unit iterates control operation of reading a signal derived from the photoelectric conversion element via the transfer transistor by the switch capacitor amplifier part in each of the pixel sections.

* * * * *